No. 606,902. Patented July 5, 1898.
J. L. TANDY & W. E. RADER.
BUNCHING ATTACHMENT FOR MOWING MACHINES.
(Application filed Oct. 4, 1897.)
(No Model.) 3 Sheets—Sheet 1.

Witnesses
Wm H. Edwards, Jr.
J. F. Mothershead

John L. Tandy
Wm E. Rader
Inventors.

By Edson Bros.
Attorneys.

No. 606,902. Patented July 5, 1898.
J. L. TANDY & W. E. RADER.
BUNCHING ATTACHMENT FOR MOWING MACHINES.
(Application filed Oct. 4, 1897.)
(No Model.) 3 Sheets—Sheet 2.
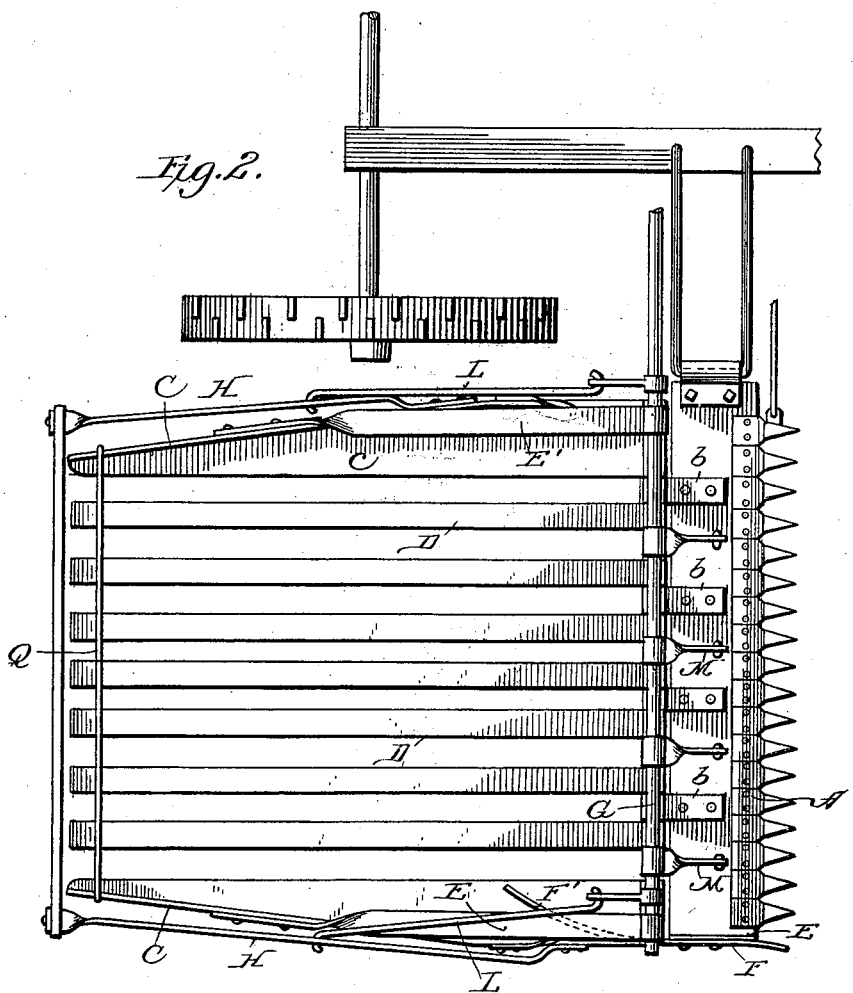
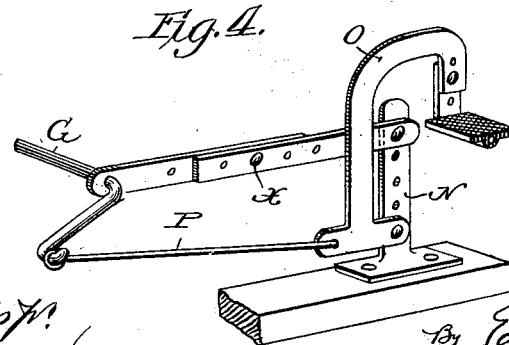

No. 606,902. Patented July 5, 1898.
J. L. TANDY & W. E. RADER.
BUNCHING ATTACHMENT FOR MOWING MACHINES.
(Application filed Oct. 4, 1897.)

(No Model.) 3 Sheets—Sheet 3.

Witnesses
Wm H Edwards Jr.
J T Mothershead

Inventors
John L Tandy and
William E Rader
By Edson Bros,
Attorneys

UNITED STATES PATENT OFFICE.

JOHN L. TANDY AND WILLIAM E. RADER, OF COLUMBIA, MISSOURI.

BUNCHING ATTACHMENT FOR MOWING-MACHINES.

SPECIFICATION forming part of Letters Patent No. 606,902, dated July 5, 1898.

Application filed October 4, 1897. Serial No. 654,047. (No model.)

*To all whom it may concern:*

Be it known that we, JOHN L. TANDY and WILLIAM E. RADER, citizens of the United States, residing at Columbia, in the county of Boone and State of Missouri, have invented certain new and useful Improvements in Bunching Attachments for Mowing-Machines; and we do hereby declare the following to be a full, clear, and exact description of the invention, such as will enable others skilled in the art to which it appertains to make and use the same.

The invention consists of an attachment for mowing-machines for bunching or windrowing grass or grain during the operation of cutting the same, and this result is attained by a peculiar mechanism which will be presently described.

The object of the invention is to provide a convenient and effective means of distributing the cut grass or grain in bunches instead of spreading it over the entire surface of the field, as is the case with ordinary mowers.

The invention is especially adapted to bunching clover when it is desired to save the seed, since, as is well known, it is better to leave such clover in bunches subject to the action of the weather for a time and during which period it should be disturbed as little as possible.

Figure 1:
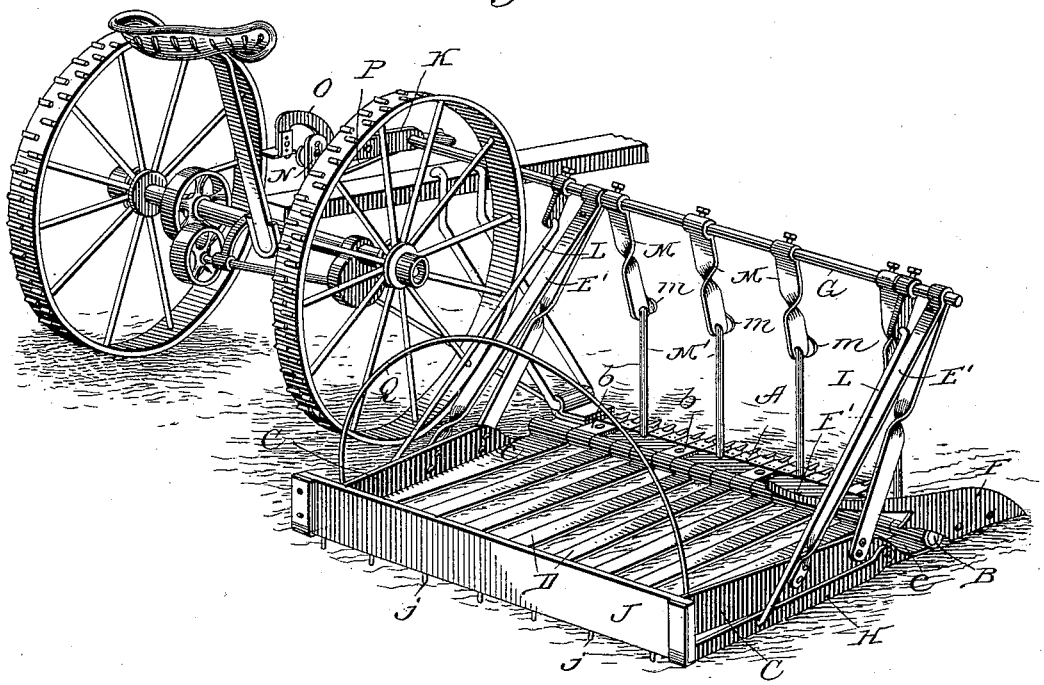
Figure 3:
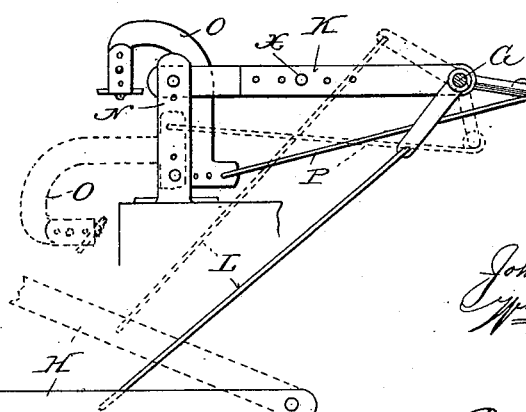
Figure 5:
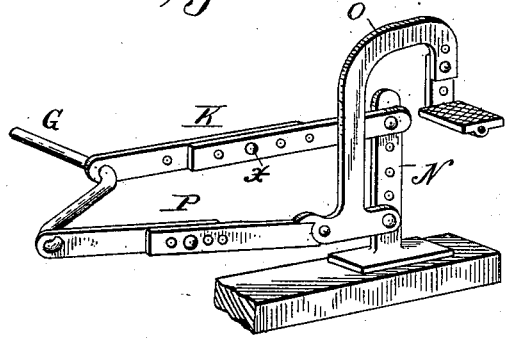
Figure 6:
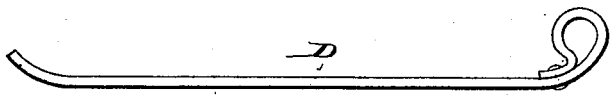

Referring to the drawings forming a part of this specification, and on which like letters of reference indicate corresponding parts in the different views, Figure 1 is a perspective view of a mowing-machine in use and which is provided with the attachment embodying the invention. Fig. 2 is a top plan view of the invention and the adjacent parts of a mowing-machine. Fig. 3 is a diagrammatic longitudinal section on line $x\ x$ of Fig. 2. Figs. 4 and 5 are details hereinafter referred to. Fig. 6 is a side elevation of one of the slats detached.

The attachment is capable of use with any ordinary mowing-machine.

The mowing-machine shown in the drawings is of the usual construction, including the wheels, axle, cutter and finger bar A, and other customary adjuncts and, being of the ordinary form, needs no special description. In the rear of and adjacent to the finger-bar and parallel therewith is a rod or bar B, which is detachably secured to the finger-bar by suitable clips $b$. The clips may be riveted to the finger-bar or they may be detachably connected therewith by bolts and nuts or suitable set-screws. To the ends of the rod or bar are rigidly connected converging or inclined side pieces C C, and between these side pieces C are arranged at intervals any number of slats or fingers D. The slats or fingers are pivoted to the bar B, so that they will drop downward by gravity and rest upon and ride over the stubble after the grass or grain has been cut. The side pieces C have lateral flanges $c\ c$ at the bottom, the said flanges being widest at their forward ends or nearest the finger-bar. This is desirable, since in bunching the clover or grain presses against the side pieces and slides along smoothly. If these flanges should be omitted, as is usual, the stubble would pull the clover or grain under the sides instead of allowing it to pass off on the slats.

E is the outside shoe on the end of the cutter or finger bar A, and to this is secured the fender F, which is attached to the shoe E at its front end and bolted or otherwise secured to the shoe at a proper point in the rear.

The fender F is provided with a suitable rod or tongue F', which forces the cut grass or grain inside the upright or inclined standard. The rod or tongue F' may be a part of or be secured to the fender F.

Extending from the side pieces or runners C at each end are two forwardly-inclined standards E'. These standards are bolted or rigidly secured at their lower ends to the side pieces or runners C and extend upwardly and forwardly in a diagonal direction, and they are formed at their upper ends with eyes or bearings for the rod, crank-shaft, or pipe G, which will be presently described. Instead of having two of these inclined arms or standards, as shown, we sometimes use a single arm at each side, with bearings at the top ends for the rod, shaft, or pipe G. Pivoted to each of the side pieces or runners at their front ends on their outer sides are the arms or bars H. To the rear ends of these arms the tail-board or gate J is secured in any suitable manner.

The gate J is of suitable width and extends from one side of the attachment to the other.

It is provided with teeth or pins $j$ on its lower edge for a purpose that will be readily apparent.

The rod, crank-shaft, or pipe G, before referred to, extends transversely of the attachment and above and parallel with the finger or cutter bar and to an arm or bar K, which is mounted on the tongue or other suitable part of the mower.

Extending downwardly in a diagonal direction from the rod or pipe G or from crank-arms projecting therefrom are rods L, which are connected at their lower ends to the arms or bars H, so that when the rod or pipe G is revolved the gate or tailpiece will be raised. The gate will ordinarily drop or close by gravity; but it will be seen that a positive rotation of the rod in the reverse direction to that for opening said gate will close it and hold it locked, as will be hereinafter explained.

Arranged at suitable intervals on the rod or pipe G, between the standards E', are a series of angular arms M, which are clamped to the rod or pipe, preferably by set-screws, and to the lower ends of the respective arms are pivoted or flexibly-connected depending arms or fingers M', substantially in line with the cutter or finger bar A, and as the pipe or rod G is revolved the mechanism just described cleans the finger-bar and forces the clover or grain out, making a division between the bunches. Stops $m$ at the lower ends of the arms M prevent the arms or fingers M' from falling too far forward.

A suitable bracket or support N is secured to the tongue or other proper part of the mower.

A lever O, shaped so as to be operated by the foot of the driver, is pivoted to the bracket N, and connected to the lower end thereof is a link P, which extends forward to and is connected with the end of the rod, crank-shaft, or pipe G, which is of crank form, so that by moving the lever O in one direction or the other the shaft or pipe G is partially revolved, the gate or tailpiece raised or lowered, and the fingers M' operate to clean the finger-bar and divide the bunches.

The lever O may be constructed so as to be operated by hand, but we prefer that it be operated by the foot, thus leaving the hands of the driver free.

At the rear of the attachment is a bow or arched rod Q, extending from one of the side pieces or runners to the others inside the gate or tailpiece for a purpose which will be apparent.

In the drawings we have shown two means for locking the gate or tailpiece in its closed position, and which we deem equivalents. In Fig. 4 we have shown the rods or levers L connected at their upper ends to rearwardly-projecting inclined crank-arms secured to pipe G and at their lower ends to the arms which carry the gate, and it will be seen that as the rod revolves the gate is closed and the line of draft is then below the center and holds the gate closed. In Fig. 5 we have shown an adjustable rod connected with the foot-piece with a lug $z$ on the lever $o$ over the connections, which when operated accomplishes the same result.

In order that the attachment may be applied to various machines—that is to say, mowers having higher or lower wheels or tongues—we have provided an adjusting means for this purpose. For this purpose the bracket N is provided at the bottom with a series of holes, so that the operating foot-piece and the lever O, which connects it with the crank-shaft G, may be raised or lowered. The link P is also made of two parts with coincident holes in the end of each, so that it may be lengthened or shortened. The standard or bracket N has a series of holes at its top, so that the link or arm K may be adjusted higher or lower thereon. The link K, which it will be remembered has a bearing at its forward end for the crank-shaft, like the lever P, is made of two parts with holes at their ends where they meet, so that they may be shortened or lengthened. Both links P and K when adjusted are held in position by a set-screw or other suitable means. The end of the front lever O is also provided with a series of holes, so that the step or foot-rest may be raised or lowered to suit the legs of the driver. The adjustment higher or lower may also be accomplished by adjusting the arm or support K by means of the set-screw X, so that the said arms or supports will be in the right relation to the crank-shaft G. The slats or fingers are bent downward at their forward ends adjacent to the bar B and upward at their rear ends, as shown, thus allowing the stubble to drag the clover or grain back rapidly.

Instead of the series of holes in the standard or bracket and levers or arms they may be slotted and accomplish the same result.

Minor changes may be made in the details of construction within the scope of the invention without departing from the spirit or sacrificing any of the advantages thereof.

Having thus fully described our invention, what we claim as new, and desire to secure by Letters Patent, is—

1. In a bunching attachment for mowing-machines, a crank-shaft, mounted to be rotated above the finger-bar, and a series of arms arranged at intervals thereon, and a series of depending rods or fingers flexibly connected to said arms, substantially as and for the purposes described.

2. In a bunching attachment for mowing-machines, a crank-shaft mounted above the finger-bar, and means for rotating said shaft, a series of arms adjustably secured to said shaft at intervals, and a series of depending rods or fingers flexibly connected to said arms, substantially as and for the purposes described.

3. In a bunching attachment for mowing-machines, a crank-shaft mounted above the finger-bar and means for rotating said shaft, a series of arms arranged at intervals on the shaft, a series of depending rods or fingers flexibly connected to the arms and stops for the rods or fingers, substantially as described.

4. In a bunching attachment for mowing-machines a crank-shaft mounted above the finger-bar, and in substantially the same vertical plane, means for rotating the crank-shaft, a receiver for the cut grass or grain, depending rods or fingers flexibly connected to the crank-shaft, an end-gate or tail-board mechanism connecting the crank-arm and end-gate adapted to raise and lock the gate, substantially as described.

5. In a bunching attachment for mowing-machines, a bar secured to the finger-bar in the rear thereof, converging sides or runners with flanged bottoms rigidly secured to the rear bar, a series of slats or fingers having the bodies thereof bent downwardly at their front ends in rear of the pivots, adjacent to the bar, and upwardly at their rear ends, said fingers being pivoted to the bar, and a suitable end-gate and means for operating the same, substantially as described.

6. In a bunching attachment for mowing-machines, means substantially as described for bunching the cut grass or grain, means for cleaning the finger-bar comprising a crank-shaft and arms, and means mounted upon the tongue or other suitable part of the mower for adjusting the crank-shaft and arms to a higher or lower position to correspond with the height of the mower or the wheels thereof, substantially as described.

7. In a bunching attachment for mowing-machines, means, substantially as described, for bunching cut grass or grain and discharging the bunches, a crank-shaft mounted above the finger-bar of the machine proper, a foot-lever, a link connected at one end to the foot-lever and at the other to the crank, and a second link pivoted at one end to a standard on the frame or tongue of the mower and formed at the other with a bearing for the crank-shaft, substantially as described.

8. In a bunching attachment for mowing-machines, means substantially as described for bunching cut grass or grain and discharging the bunches, a crank-shaft mounted above the finger-bar of the machine for operating said mechanism, a foot-lever, a link connected at one end to the foot-lever and at the other to the crank, and a second link pivoted at one end to a standard on the frame or tongue of the mower and formed at the other with a bearing for the crank-shaft, and means for adjusting the length of the links, substantially as described.

In testimony whereof we affix our signatures in presence of two witnesses.

JOHN L. TANDY.
WILLIAM E. RADER.

Witnesses:
E. STEWART,
H. H. TANDY.